United States Patent [19]

Ohkawa

[11] 4,354,998
[45] Oct. 19, 1982

[54] METHOD AND APPARATUS FOR REMOVING IONS TRAPPED IN A THERMAL BARRIER REGION IN A TANDEM MIRROR FUSION REACTOR

[75] Inventor: Tihiro Ohkawa, La Jolla, Calif.

[73] Assignee: General Atomic Company, San Diego, Calif.

[21] Appl. No.: 76,466

[22] Filed: Sep. 17, 1979

[51] Int. Cl.³ .................................................. G21B 1/00
[52] U.S. Cl. .................... 376/140; 376/137; 376/146
[58] Field of Search .......................... 176/3, 6, 7, 9, 5

[56] References Cited

U.S. PATENT DOCUMENTS

| 4,125,431 | 11/1978 | Fowler | 176/3 |
| 4,149,931 | 4/1979 | Christensen | 176/9 |
| 4,252,608 | 2/1981 | Baldwin et al. | 176/5 |

FOREIGN PATENT DOCUMENTS 51-42896  4/1976  Japan ...................... 176/9

OTHER PUBLICATIONS

UCID-18156, 4/79, Baldwin et al., pp. 1-44.
UCRL-78740, 10/76, Fowler et al., pp. 1-11.
Nuclear Fusion, vol. 17, 1977, pp. 481-496, Stott et al.
UWFDM-68, vol. 1, 3/74, pp. (III-A-1)-(III-C-8).
Ans Trans., vol. 27, 11/27-12/2/77, pp. 26, 27, Conn et al.
Soviet Atomic Energy, vol. 24, No. 6, 6/68, pp. 675-678, Skosyrev et al.

*Primary Examiner*—Harvey E. Behrend
*Attorney, Agent, or Firm*—Fitch, Even, Tabin, Flannery & Welsh

[57] ABSTRACT

A method and apparatus for clearing thermal barrier regions of trapped ions in a tandem mirror fusion reactor apparatus utilizing a bend at each end of the cylindrical plasma chamber within which bend the thermal barrier is positioned. Ions trapped in said thermal barrier are caused by said bend to drift in a direction perpendicular to the incident magnetic field and the direction of centrifugal force, such that said ions are enabled to be collected in a divertor positioned along said ion drift path.

6 Claims, 5 Drawing Figures

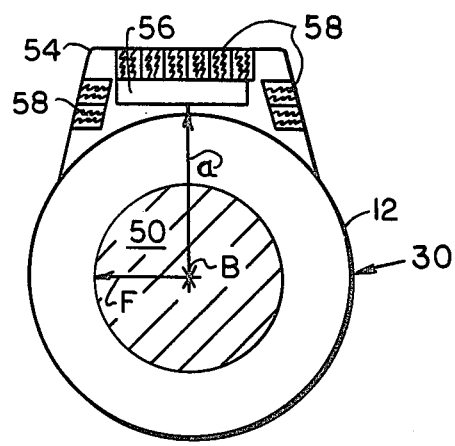
FIG. 3
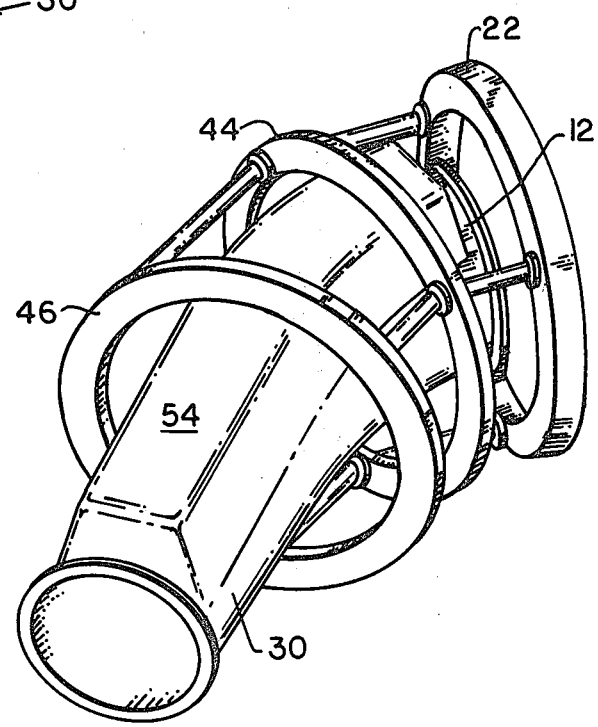
FIG. 4
FIG. 5
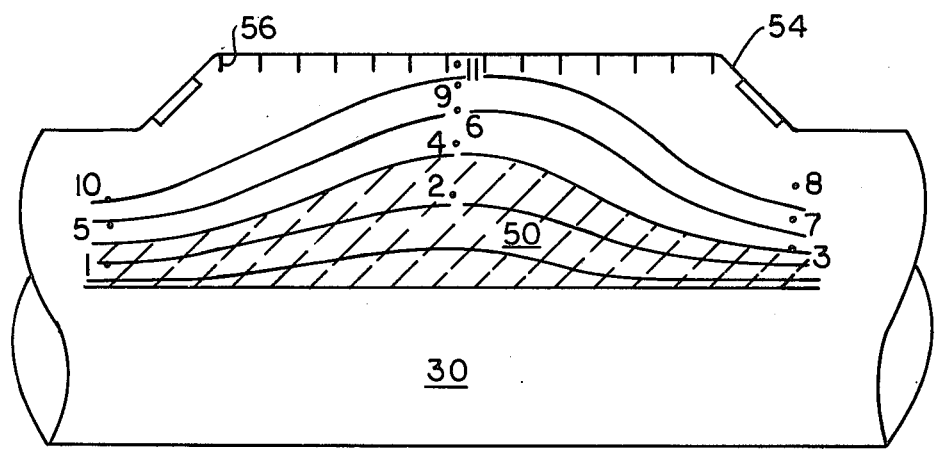

METHOD AND APPARATUS FOR REMOVING IONS TRAPPED IN A THERMAL BARRIER REGION IN A TANDEN MIRROR FUSION REACTOR

The present invention is directed in general to means for improving the power gain factor in a tandem mirror fusion reactor, and more particularly, to a method and apparatus for passively clearing ions trapped in thermal barrier regions formed in a high temperature plasma.

Two types of devices are generally favored for generating and confining plasmas. These are the toroidally shaped magnetic confinement devices and the linear cylindrically shaped tandem mirror magnetic confinement devices. The plasma comprises ionized gases including approximately equal numbers of positively charged ions and free electrons at high temperatures. The goal is to generate a fusion reaction in the plasma such that the energy obtained therefrom exceeds the input energy to the system, thereby providing useful output power. The easiest fusion reaction is generated from the bringing together of the two heavy isotopes of hydrogen, deuterium and tritium. When these two particles fuse together, a helium nucleus (alpha particle), a neutron and 17.6 million electron volts of energy are generated.

The difficulty with such fusion reactions is that the plasma must exist at an extremely high temperature over a relatively long period of time to first obtain and then maintain the fusion reaction. Such temperatures are needed to overcome the electrostatic Coulomb repulsion between the deuterium and tritium ions. Magnetic and/or electrical field confinement configurations were found to be required to prevent loss of plasma temperature to adjacent walls of the plasma confinement chamber or cell. In addition, the fusion reaction generally produces highly energized protons, neutrons and other particles. A significant problem in the initial formation and sustained maintenance of a high temperature plasma involving such high energy particles is the problem of excluding impurity particles from the plasma. Such impurities are found to cause substantial and potentially disabling plasma energy losses.

These energy losses arise because the contaminants generally have a higher atomic number than hydrogen, and the type of electronic excitation, ion recombination and bremsstrahlung radiation losses produced by their presence in the hydrogen plasma (i.e., hydrogen, deuterium, tritium and mixtures thereof) become increasingly deleterious with increasing atomic number of the contaminant.

There are a few principal sources for the above-mentioned impurities. First, contaminants such as oxygen, nitrogen or carbon previously absorbed in the walls of the plasma chamber, enter the plasma due either to the vacuum required for operation of the plasma or as a result of other conditions employed to form the plasma initially. Another principal source of contaminants results from the bombardment of the chamber wall material itself by the above described energetic plasma particles and radiation, which tends to cause sputtering or even melting of the chamber wall. Suitable vacuum techniques and high temperature baking may be employed to minimize the adverse effects of absorbed contaminants, but the problem of contaminants produced by bombardment and erosion of the plasma chamber walls have provided substantial difficulties. Finally, helium "ash" impurities generated by the fusion reactions must also be periodically stripped off from the plasma.

In the prior art, complicated magnetic divertor systems have been designed in an effort to remove these impurities, but such divertors have been expensive, complex, and otherwise disadvantageous. Conventional divertor devices function to skim off the most contaminated plasma near the wall of the plasma confinement chamber.

Tandem mirror reactors confine the fusion plasma ions in an open ended magnetized cylindrical central cell. Axial confinement (end plugging) of the cell is generated by electrostatic potentials of more dense magnetic "mirror" confined plasmas. In operation, the mirror at each end of the fusion reactor acts as a magnetic bottle to narrow the magnetic field and thereby cause the plasma to turn back on itself. That is, the mirror coils at the end of the central cell constrict the magnetic field lines with new field lines, thereby increasing the magnetic field in this region. These extra magnetic field lines push the normal field lines together around the end, with the result that particles within the cell tend to follow the field lines until they are deflected back as if they had come in contact with a mirror.

However, some ion leakage still occurs at the portion of the mirror corresponding to the axis of the cylindrical cell, so that a baseball magnet having a minimum-B field is also needed to turn particles around, thereby maintaining the plasma within the central cell of the fusion reactor with a minumum of end loss.

A recent improvement in the design of tandem mirror fusion reactors proposed by Baldwin et al., [Baldwin et al., "An Improved Tandem Mirror Fusion Reactor", Lawrence Livermore Laboratory, UCID-18156, April 1979] provides means for enabling a larger electric potential to be generated in the end plug to thereby increase the efficiency of the mirror apparatus. The difficulty in older systems attempting to increase the end plug electrostatic potential was that either the density of the end plug plasma had to be increased, or the temperature thereof had to be increased. The problem with the former is that it led to unacceptable power losses and a large increase in density would produce only a small increase in field potential. Increasing the temperature was also difficult since the hotter electrons would not remain in the end plug, but would diffuse into the rest of the reactor.

The Baldwin et al. improvement is accomplished by trapping hotter electrons in each end plug. Baldwin et al. disclosed means for thermally insulating the end plug electrons from contact with those in the solenoid central cell and means, in conjunction therewith, for heating the end plug electrons. Auxiliary heating of the electrons in the end plug may include the use of an electron cyclotron resonance heating unit [ECRH] or other microwave energy source.

A key benefit provided by the generation of such an electron temperature differential is that it enables a plasma electrical potential barrier to be generated with a much lower end plug plasma density. In the original tandem mirror concept, the end plug plasma density $n_p$ had to be much greater than the plasma density of the central cell $n_c$. This new concept enables $n_p$ to be approximately the same as or even less than the cell density $n_c$. Thus, the large reduction in the required plug plasma density enabled by the higher electron temperature in each end plug both reduces the power consumed in the plugs and opens up the ability to use much simpler and less sophisticated technology in the end plugs.

The end plug electron thermal insulation is created by generating a depression in the plasma potential at the entrance to each end plug, which thereby serves as an electron "thermal barrier" between each of the end plugs and the solenoid central cell. The thermal barrier is generated most simply by placing a simple mirror coil at the end of the central cell which serves to throttle down the flow of plasma ions from the central cell as said flow moves towards an adjacent end plug. The density is caused to drop as the plasma expands in cross section as it emerges from the high magnetic field at the throat of the mirror coil, thereby creating a potential depression $\phi_b$. This depression in the positive potential appears to the negatively charged electrons as a potential barrier and therefore serves as an electron "thermal barrier" between the end plug and the reactor central cell. Thus, so long as the electrons are heated in the end plug at a rate faster than they can escape from the plug by collisions, the electron temperature in the end plug rises relative to the electron temperature in the central cell. Further details of the operation of this thermal barrier are described herein below.

Although the thermal barrier concept provides significant potential advantages, a major difficulty is that "passing particles", i.e., ions and electrons crossing the thermal barrier, sometimes collide, causing some of these particles to be trapped in this thermal barrier region between the magnetic mirror and the end plug. In time, because of such collisions, the trapped particle density would grow until the total pressure thereof would equal or exceed the pressure in the central cell of the reactor. Thus, some means is required to pump out or otherwise eliminate these trapped particles from the thermal barrier.

One solution for reducing the number of trapped ions would be to use magnetic pumping techniques, i.e., generating a new magnetic oscillating field. Such a field would cause the trapped ions to become more energetic, such that they could ultimately escape from the thermal barrier magnetic well back into the stream of plasma ions energetic enough to be able to freely pass across the thermal barrier. The difficulty with such a magnetic pumping system is that it requires the use of additional power in operation; it does not operative passively. A system for eliminating such trapped ions from the thermal barrier without the requirement that additional power be used therefor would thus have high utility.

A further drawback of the above described magnetic pumping system is that it requires the use of copper coils close to the plasma for generation of the oscillating magnetic field. This is also undesirable due to the fact that such coils would tend to react with the plasma, becoming a generator of further impurities. Such coils also would be degraded over time due to the radiation incident thereon.

Additionally, many of the ions trapped in the thermal barrier would also be impurity ions, and since control of impurities may become a problem, it would also be desirable to provide means for eliminating such impurities from the reactor, rather than reenergizing them and enabling them to reenter the plasma.

Accordingly, it is an object of the present invention to provide a method and apparatus for passively removing ions trapped in a thermal barrier formed in a tandem mirror fusion reactor, to ensure that there is no buildup of such ions therein.

It is a further object of the present invention to provide such a method and apparatus whereby trapped impurities are removed from the thermal barrier but not returned to the plasma.

A still further object of the present invention is to provide such an apparatus which is simple in construction and which does not otherwise disrupt the flow of the plasma.

Still another object of the present invention is to provide a method that is static, not involving pulsed or AC components, and a method that eliminates the need for copper coils or other degradable material in the high energy plasma environment.

These and other objects and advantages of the present invention will become more apparent upon reference to the following description and the accompanying drawings, in which:

FIG. 3 is a cross-sectional view of the fusion plasma chamber and divertor chamber taken along the line III—III of FIG. 1;

FIG. 4 is a perspective view of divertor and thermal barrier chambers in said reactor apparatus; and FIG. 5 is a side elevational view of divertor and thermal barrier chambers illustrating diagrammatically a fusion plasma and the drift of an exemplary trapped ion in the thermal barrier region according to the present invention.

Generally, the present invention is directed to a method and apparatus for removing ions trapped in a thermal barrier formed between a mirror coil and an end plug in a fusion reactor apparatus, such that these trapped ions are caused to drift into a divertor positioned in the path of said ion drift. The ions are caused to diffuse across the magnetic field and drift across said thermal barrier region due to a bend formed along the normal path of the reactor plasma at a point in the area between the end plug and an adjacent mirror corresponding to the thermal barrier region. The bending of the plasma along a curvature of radius R is generated by one or more magnetic turning coils, such that ions trapped in said regions are caused to drift perpendicular to the centrifugal lines of force generated thereby and the direction of the incident magnetic field. Thus, the trapped ions are caused to drift perpendicular to the plane of the bending. The trapped ions continue to be forced away from the plane of plasma bending along a perpendicular path until they come in contact with a divertor, which thereby acts to remove such ions from the plasma chamber. Although removal of all trapped ions constitutes a continuing power loss to the plasma, it is deemed to be, at worst, equivalent to the energy required to operate the magnetic pump required by the prior art to eliminate such trapped ions.

For particles in the plasma which are not trapped in the thermal barrier, but continue to be reflected by magnetic mirrors back and forth in the central cell of the fusion reactor apparatus, the plasma column in the thermal barrier regions on each end of the central cell must be bent in opposite directions. This is so that the displacements of orbits due to the curvature drift imparted to ions in each barrier region are cancelled out for such untrapped, i.e., passing, ions.

Figure 1:
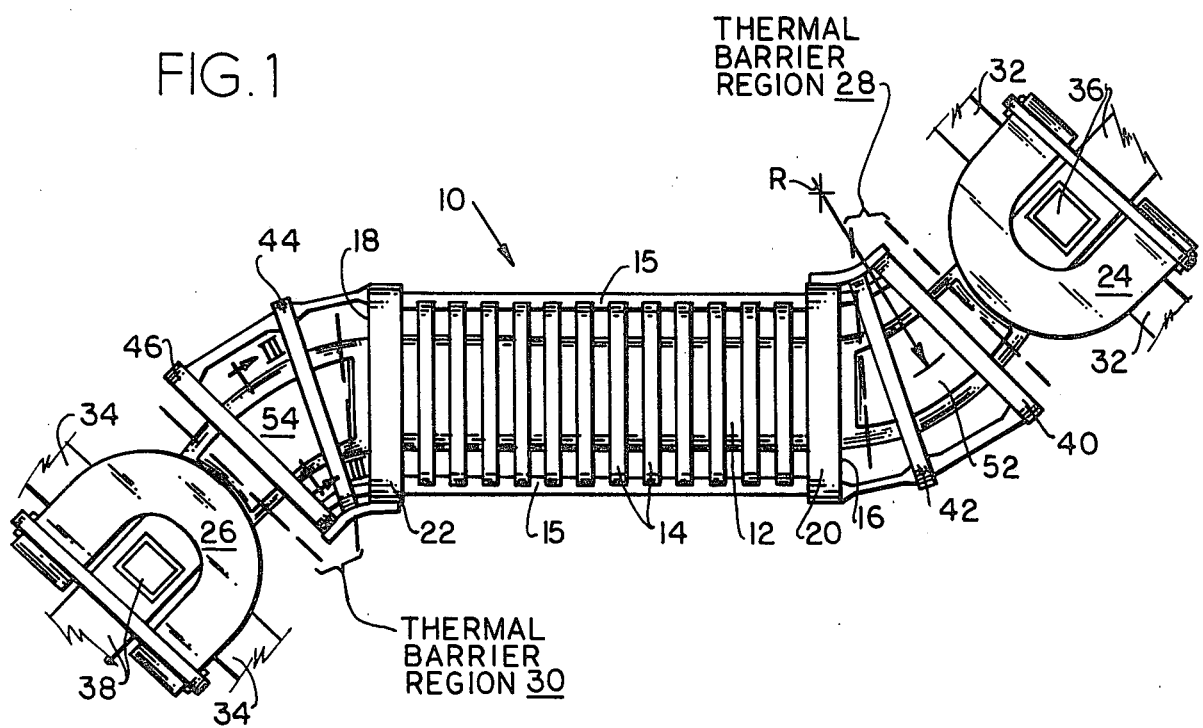
FIG. 1 is a top plan view of a fusion reactor apparatus according to the present invention.

The particular invention may be more clearly understood with reference to the figures, in which FIG. 1 is a top plan view of a fusion reactor apparatus 10 according to the present invention.

As seen in FIG. 1, the fusion reactor apparatus 10 includes a central cell or chamber 12 for plasma generation and confinement. A plasma formed in the central cell 12 is maintained therein by means of a plurality of solenoid coils 14 positioned along the length of the central cell 12. As can be seen, the central cell 12 is an elongated chamber preferably in a cylindrical shape. Coils 14 are positioned with respect to chamber 12 by means of supports 15.

To impede particles in the plasma from escaping out the open ends 16 and 18 of the central cell 12, mirror means are provided to cause the plasma to be reflected back into the central cell 12. The mirror means at each end includes a respective mirror coil 20, 22 and an adjacent baseball minimum-B magnet 24, 26. The baseball magnets 24, 26 are so called due to their shape, which approximates the shape of the seam on a conventional baseball. Each mirror coil 20, 22 acts to throttle down the flow of plasma from the central cell 12 towards its adjacent baseball magnet. The baseball magnets 24, 26 act as the end plugs for the plasma. In the absence of particle collisions, the plasma density drops as it expands in cross section as it emerges from the high magnetic field at the throat of the mirror coil. The density drop creates a depression $\phi_b$ in the positive potential. As previously described, this creates a potential barrier to the negatively charged electrons, and therefore serves as the electron thermal barrier between each mirror 20, 22 and its respective end plug 24, 26. The area within each reactor chamber 12 in which such thermal barrier regions are created is marked of at 28 and 30.

Figure 2:
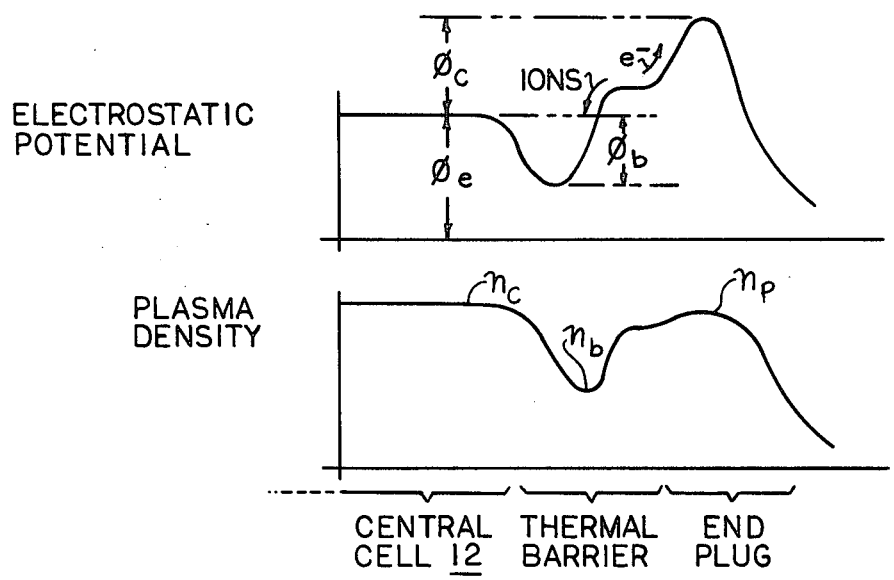
FIG. 2 is a diagram of electrostatic potential and particle density magnitudes in a thermal barrier region.

FIG. 2 illustrates axial profiles electrostatic potential and particle density in the thermal barrier and end plug regions at one end of the cell 12. As seen in the electrostatic potential curve, $\phi_e$ is the base potential of the central cell 12 and $\phi_c$ is the increased potential enabled in the end plug due to the existence of the thermal barrier potential, identified as $\phi_b$. As can be seen, electrons (e−) tend to fall upward in this curve into the end plug due to their negative charge, while ions tend to fall down into the potential well $\phi_b$ in the thermal barrier due to their positive charge. An exemplary plasma density curve is also shown in FIG. 2, wherein $n_c$ is the central cell plasma density, $n_p$ is the end plug plasma density and $n_b$ is the plasma density in the thermal barrier. Since energetic electrons are trapped in the end plug, $n_p \lesssim n_c$ rather than $n_p > > n_c$. The present invention is directed at keeping $n_b$ at a minimum, to prevent it from equalling or exceeding the density of passing ions.

Referring again to FIG. 1, to deposit heating power in the plasma, conventional high energy beams of neutral hydrogen atoms are coupled thereto at points 32 and 34 on respective end plugs 24, 26. These neutral atoms freely enter the plasma magnetic envelope and are then stripped of their electrons by collisions and retained in the plasma as energetic ions. The retained ions heat the plasma as they gradually slow down, transferring energy to the plasma particles. Also included at the end plugs are ducts 36 and 38 for vacuum pumping and microwave heating of the end plug electrons.

As previously described, a difficulty with the thermal barrier concept is that collisions of particles passing across the thermal barrier cause some of these particles to lose energy and be trapped in the thermal barrier region. In time, the trapped particle density would grow until the total pressure would equal or exceed the pressure in the central cell 12. The present invention provides a bend in the plasma column at the thermal barrier region to prevent such an increase in trapped particle density. The bend in the plasma is accomplished by means of turning coils, coils 40 and 42 for bending of the plasma in the thermal barrier region 28, and coils 44 and 46 for bending of the plasma in the thermal barrier region 30.

This bend in the thermal barrier, having a radius R as seen in FIG. 1, creates a centrifugal force F on the particles, with F being proportional to the inverse of radius R of bending. The effect of this force, in conjunction with the incident magnetic field, is to create a drift velocity in the plasma ions which is perpendicular to the plane of the bending. That is, the direction of the drift velocity $V_d$ is given by the cross product of the centrifugal force F and the magnetic field B, or:

$$\vec{V_d} \| \vec{F} \times \vec{B} \tag{1}$$

FIG. 3 is a cross-sectional view of the thermal barrier region 30 of FIG. 1. A plasma zone comprising a predominant amount of plasma is also shown in cross section as plasma region 50. The flux lines of the incident magnetic field flow in a direction into the plane of the cross section, as indicated at B. The centrifugal force exerted in plasma region 50 due to the bending of the plasma in this region is shown diagrammatically at F. The direction of ion orbital drift is upward out of the plasma region 50, as shown at a in FIG. 3.

FIGS. 1 through 3 also illustrate the position of divertor means, comprising a divertor 52 positioned with respect to thermal barrier region 28 and a divertor 54 positioned with respect to thermal barrier region 30. As seen more clearly in FIG. 3, the divertor 54 is positioned at the top of the thermal barrier region 30 such that it is in the path of ions as they are caused to drift upwards as a result of the bend in the plasma region 50.

The divertor 54, as seen in FIG. 3, strips off impurities from the fusion reactor, and is of a conventional design. The divertor includes particle collection vanes 56 and cryopanels 58. The collection vanes 56 are maintained at approximately room temperature, and the cryopanels 58 are kept at a substantially reduced temperature to trap the gas given off by the collection vanes. The reason for this structure is that the particles which hit the divertor 54 are very energetic. Thus, surface heat loading on said vanes 56 is very large. The vanes are kept at room temperature to help prevent overheating of the cryopanels and not desorb trapped gas on cold vanes such that when particles hit vanes, gas desorbs.

Therefore, in operation the divertor 54 pumps ions out of the thermal barrier region 30 by neutralizing the ions that hit the divertor. The ions recombine with electrons in the divertor collection vanes 56 forming a neutral gas. To prevent the gas from drifting back into the plasma region 50, it is trapped in the cryopanels 58 by freezing the gas out. Such cryopanels are used since they are the only structure that has the speed needed to effectively take the gas out of the system. The cryopanels are periodically warmed to enable the gas trapped thereon to be pumped off using conventional pump means.

An alternative to the divertor means 54 is the use of the gettering material, a metal that has a chemical affinity for the gases that are coming off. Certain metals, e.g., tantalum or titanium, can absorb enormous quantities of foreign gas. The problem with such materials is that they must constantly be replaced or removed and cleaned and then reinserted. Additionally, such materials also tend to inject other impurities into the plasma.

FIG. 4 illustrates a perspective view of the thermal barrier region 30, respective turning coils 44 and 46, and the divertor 54 positioned with respect thereto.

The fact that ions trapped in a thermal barrier region are eliminated therefrom, i.e., lost to the divertor, in a drift time much less than the filling time of the thermal barrier, is seen from the following equations. Drift velocity $V_d$ is given by:

$$V_d = T_i/ZeBR \qquad (2)$$

where Z is the charge number of the trapped ion, R is the radius of curvature of the bend in the plasma in the thermal barrier region, B is the magnetic field strength, and $T_i$ is the ion temperature.

Ions are lost from the barrier region in the period $\tau_d$, the "drift time", given by:

$$\tau_d = ZeBR\alpha/T_i \qquad (3)$$

where "$\alpha$" is the radius of the thermal barrier region, i.e., the distance an ion must travel from the plasma to the divertor. FIG. 3 illustrates this dimension "$\alpha$" in the exemplary plasma region 50.

The filling time of ions into the thermal barrier region, $\tau_g$, is given roughly by:

$$\tau_g \sim \frac{\sqrt{A}}{v_{ii}Z^2} \qquad (4)$$

where A is the mass number of the ion and $v_{ii}$ is the proton-proton collision frequency. Under typical operating conditions as set forth by Baldwin et al., and at reasonable radii R, these equations show that $\tau_d < < \tau_g$, so that the thermal barrier regions 28, 30 do not fill up with trapped ions.

Further, since $\tau_d < < \tau_g$, the loss time is determined by $\tau_g$. Thus, for impurity ions at a high temperature, equation (4) shows that $$\frac{Z^2}{\sqrt{A}} >> 1,$$

e.g., for oxygen with Z=8 and A=16, $Z^2/\sqrt{A}=16$, whereas for hydrogen Z=1 and A=1, so that $Z^2/\sqrt{A}=1$. As seen from these examples, impurity ions are removed from the thermal barrier region at a much faster rate than hydrogen ions, thereby enhancing the operation of the associated divertor in controlling the level of impurities in the plasma.

Divertor functioning is further enhanced for impurity ions, due to the effects of the electrostatic potential on such ions in the thermal barrier region. This electrostatic potential produces an electric field mainly parallel to the magnetic field in the plasma region 50. Since the potential well for ions is proportional to the atomic weight Z of the ion, it is much deeper for the higher atomic weight impurity ions than for hydrogen ions. As a result, the effective mirror ratio for the impurity ions, a measure of the ease with which particles are reflected from a given region, is correspondingly larger. The trapping and subsequent ejection of impurity ions from the plasma are thus further improved.

An exemplary trapped ion drift path in the thermal barrier region 30 is illustrated diagrammatically in FIG. 5. The particle path is shown starting at point 1 in the midst of the plasma region 50, and ending at point 11 against a particle collection vane 56 in the divertor 54. Keep in mind that as the trapped ion is reflected back and forth between the mirror 22 and the adjacent end plug 56 while being caused to drift progressively further away from the plasma region 50, it remains stuck in the potential well of the thermal barrier region 30. The orbit of the ion in the well is merely shifted until the particle hits divertor 54, which comprises an obstruction in the well at this outer ion orbit radius.

Lastly, as seen in FIG. 1, for the passing plasma ions not trapped in either thermal barrier region 28 or 30, means must be provided so that the drift velocity imparted to the untrapped ions at each end of the plasma cell 12 is prevented from being additive. This means comprises bending of the two ends of cell 12 in opposite directions with respect to one another. Consequently, the displacement of the ion orbits due to the drift velocity imparted to such ions in each thermal barrier region are opposite in direction, thus cancelling each other out.

It is to be understood that the foregoing description merely illustrates a preferred embodiment of the present invention, and that various modifications, alternatives and equivalents thereof will become apparent to those skilled in the art. Accordingly, the scope of the present invention should be defined by the appended claims and equivalents thereof.

I claim:

1. In a tandem mirror fusion reactor having an elongated central cell extending substantially straight longitudinally along an axis and surrounded by magnetic confinement means providing magnetic flux extending in a column axially between the two ends of said cell for confining plasma ions to motion in a column substantially axially of said cell between the ends thereof, and an end plug at each end of said cell providing an electrostatic potential that reflects plasma ions substantially axially toward the other end of said cell for containing a high temperature plasma in said central cell, and including a mirror coil positioned about the axis of said cell between said central cell and each of said end plugs for generation thereby of a thermal barrier region between said mirror coil and the adjacent end plug, in which barrier region plasma ions are trapped upon collision with each other, a method for removing ions trapped in said barrier region comprising the steps of:
   (a) applying magnetic field by means of at least one turning coil positioned about the axis of said flux column between each said mirror coil and the respective end plug, with said at least one turning coil being not coaxial with said central cell, to deflect lines of flux passing through said mirror coil to bend the axis of the column of flux in the respective said thermal barrier region in a plane, in which region trapped ions moving substantially axially are thereby caused to drift out of the plasma column perpendicularly to the plane of said bending; and
   (b) collecting said ions that drift from the plasma column in said thermal barrier region.

2. A method in accordance with claim 1 wherein the radius R of said bend is chosen such that a desired drift velocity $V_d$ is obtained for said trapped ions as a function of $$V_d = T_i/ZeBR$$

where B is the magnetic field strength in the thermal barrier region, Z is the charge number of the trapped ions, and $T_i$ is the ion temperature.

3. The method of claim 1 wherein said bending between one said mirror coil and the respective end plug causes plasma ions to drift in a first direction relative to the axial path of the trapped ions, and wherein said bending between the other said mirror coil and the respective end plug causes plasma ions to drift in the opposite direction relative to the axial path of the trapped ions such that net movement of passing ions is cancelled thereby.

4. In a tandem mirror fusion reactor having an elongated central cell extending substantially straight longitudinally along an axis and surrounded by magnetic confinement means for providing magnetic flux extending in a column axially between the two ends of said cell for confining plasma ions to motion in a column substantially axially of said cell between the ends thereof, and an end plug at each end of said cell for providing an electrostatic potential that reflects plasma ions substantially axially toward the other end of said cell for containing a high temperature plasma in said central cell, and including a mirror coil positioned about the axis of said cell between said central cell and each of said end plugs for generation thereby of a thermal barrier region between said mirror coil and its adjacent end plug, in which barrier region plasma ions are trapped upon collision with each other, an apparatus for removing ions trapped in said barrier region comprising:

plasma bending means including at least one turning coil positioned about the axis of said flux column between each said mirror coil and the respective end plug, with said at least one turning coil being not coaxial with said central cell, for applying magnetic field to deflect lines of flux passing through said mirror coil to bend the axis of the column of flux in the respective said thermal barrier region in a plane, in which region trapped ions moving substantially axially are thereby caused to drift out of the plasma column perpendicularly to said plane; and means disposed in the path of said drifting ions for collecting ions drifting from the plasma column in said thermal barrier region.

5. A method according to either of claims 1 and 2 wherein said applied magnetic field bends the axis of the column of flux oppositely at the respective ends of said cell, whereby plasma ions passing between said end plugs are caused to drift oppositely at the respective ends to keep such passing ions in the plasma.

6. Apparatus according to claim 4 wherein said turning coils at the respective ends of said central cell bend the axis of the column of flux oppositely, whereby plasma ions passing between said end plugs are caused to drift oppositely at the respective ends to keep such passing ions in the plasma.

* * * * *